(12) United States Patent
Zeygerman

(10) Patent No.: US 8,466,388 B2
(45) Date of Patent: Jun. 18, 2013

(54) WORKPIECE PROCESSING SYSTEM

(75) Inventor: Leonid Zeygerman, West Hartford, CT (US)

(73) Assignee: Trumpf, Inc., Farmington, CT (US)

( * ) Notice: Subject to any disclaimer, the term of this patent is extended or adjusted under 35 U.S.C. 154(b) by 351 days.

(21) Appl. No.: 12/755,219

(22) Filed: Apr. 6, 2010

(65) Prior Publication Data

US 2010/0252542 A1 Oct. 7, 2010

Related U.S. Application Data

(60) Provisional application No. 61/167,298, filed on Apr. 7, 2009.

(51) Int. Cl.
*B23K 26/02* (2006.01)

(52) U.S. Cl.
USPC .................................... 219/121.83

(58) Field of Classification Search
USPC .............. 219/121.6, 121.62, 121.81, 124.31, 219/220
See application file for complete search history.

(56) References Cited

U.S. PATENT DOCUMENTS

| 3,486,744 | A | | 12/1969 | Beyers et al. |
| 4,345,744 | A | | 8/1982 | Leibinger et al. |
| 5,049,723 | A | * | 9/1991 | Macdonald .............. 219/121.83 |
| 6,300,592 | B1 | | 10/2001 | Ulrich et al. |
| 7,682,555 | B2 | | 3/2010 | Annas |
| 2003/0034336 | A1 | | 2/2003 | Erlenmaier et al. |
| 2004/0232120 | A1 | | 11/2004 | Wessner |
| 2007/0151958 | A1 | | 7/2007 | Modra |
| 2008/0230523 | A1 | | 9/2008 | Graf |
| 2010/0252538 | A1 | | 10/2010 | Zeygerman |

FOREIGN PATENT DOCUMENTS

| CN | 101032787 | 9/2007 |
| CN | 200945548 | 9/2007 |
| DE | 9201827.0 | 5/1992 |
| DE | 9201827 | 7/1992 |
| DE | 4210518 | 10/1993 |
| DE | 102006035895 | 2/2008 |
| DE | 102007027987 | 10/2008 |
| FR | 2702980 | 9/1994 |
| JP | 61020680 | 1/1986 |
| JP | 61286086 | 12/1986 |
| JP | 62187590 | 8/1987 |

(Continued)

OTHER PUBLICATIONS

Notification of Transmittal of the International Search Report and the Written Opinion of the International Search Authority for corresponding PCT Application No. PCT/US2010/030067, mailed Jul. 8, 2010, 13 pages.

(Continued)

*Primary Examiner* — William D Coleman
(74) *Attorney, Agent, or Firm* — Fish & Richardson P.C.

(57) ABSTRACT

A workpiece processing machine, such as a laser cutting machine, includes a motion unit having an associated drive, a cutting head mounted on the motion unit and configured to deliver a cutting beam, and a suction duct or other form of beam interceptor coupled to the motion unit so that it moves therewith and an opening of the suction duct is positioned below the cutting head during a workpiece processing operation. The machine also includes a frame configured to support the motion unit and defining a movement area of the motion unit, the frame having a beam located generally centrally in the movement area.

22 Claims, 13 Drawing Sheets

FOREIGN PATENT DOCUMENTS

| | | |
|---|---|---|
| JP | 62224490 | 10/1987 |
| JP | 63063596 | 3/1988 |
| JP | 1166895 | 6/1989 |
| JP | 02263572 | 10/1990 |
| JP | 04105785 | 4/1992 |
| JP | 6055290 | 3/1994 |
| JP | 6297181 | 10/1994 |
| JP | 8132270 | 5/1996 |
| JP | 10137943 | 5/1998 |
| JP | 10225789 | 8/1998 |
| JP | 2000263356 | 9/2000 |
| JP | 2008060614 | 3/2008 |
| WO | 2007028402 | 3/2007 |
| WO | 2007028403 | 3/2007 |
| WO | 2007028404 | 3/2007 |
| WO | 2007134629 | 11/2007 |
| WO | 2008151839 | 12/2008 |

OTHER PUBLICATIONS

Final Office Action from U.S. Appl. No. 12/755,128, mailed Jan. 11, 2013, 10 pages.

* cited by examiner

WORKPIECE PROCESSING SYSTEM

CROSS REFERENCE TO RELATED APPLICATION

Under 35 U.S.C. §119(e)(1), this application claims the benefit of prior U.S. provisional application 61/167,298, filed Apr. 7, 2009, the entire contents of which are hereby incorporated by reference.

TECHNICAL FIELD

This invention relates to workpiece processing systems, such as those for processing sheet-form workpieces, such as by cutting sheet metal using a laser beam.

BACKGROUND

Many machines for the processing of sheet-metal into desired components are fairly large systems, particularly those that process standard metal sheets that may be several feet in both width and length. It is generally considered important that the machine maintain a known position of the sheet metal with respect to a processing head, such as a cutting head, during processing.

In many such machines, the sheet metal workpiece is placed upon a support that remains stationary as a cutting head traverses the workpiece across a workpiece processing area. These machines generally employ a heavy and stiff frame that supports both the workpiece and processing head and the necessary motion systems that provide the relative motion. Such frames can weigh in excess of several thousand pounds, for example.

Particularly in processing machines that employ a high power beam, such as a laser beam, to process the workpieces, it can occur that the beam at times passes undeflected beyond the workpiece and can potentially damage machine components on the opposite side of the workpiece processing area.

SUMMARY

One aspect of the invention features a workpiece processing machine that includes a machine frame configured to support a sheet-form workpiece during processing of the workpiece across an elevated workpiece processing area. A processing head of the machine is configured to controllably traverse the workpiece processing area while emitting a processing beam into the workpiece processing area to engage and process a supported workpiece in the workpiece processing area. The machine includes a beam interceptor positioned on a side of the workpiece processing area opposite the processing head and controlled to move across the workpiece processing area in coordination with the cutting head along at least one axis, so as to remain positioned to intercept undeflected processing beam radiation leaving the workpiece processing area. The machine frame includes opposing lateral frame sections extending along opposite sides of the workpiece processing area and supporting the processing head, and a structural connecting frame section connecting the opposing lateral frame sections and extending across the workpiece processing area on the side of the workpiece processing area opposite the processing head. The beam interceptor traverses the workpiece processing area between the processing head and the connecting frame section, such that material of the connecting frame section is protected by the beam interceptor from undeflected cutting beam radiation during workpiece processing.

The connecting frame section is preferably of sufficient structural strength and rigidity to enable lifting of the cutting system as a single unit without damage to the machine.

In some embodiments, the connecting frame section includes a principal beam structurally connecting the opposing lateral frame sections and aligned with a center of gravity of the machine. The connecting frame section further includes, in some cases, at least one lateral frame stiffening beam spaced from the opposing lateral frame sections and connecting the principal beam to a side frame member of the machine frame. In some other examples, the connecting frame section consists essentially of the principal beam laterally aligned with a center of gravity of the machine.

In some embodiments the principal beam of the connecting frame is of triangular transverse cross-section. The principal beam may be arranged such that an upper apex of the triangular transverse cross-section is disposed at an elevation of the center of gravity of the machine. The machine includes, in some examples, a lifting lug detachably connected to the principal beam at a position along the principal beam spaced from the opposing lateral frame sections, such as at a position corresponding to the center of gravity of the machine.

In some examples, the connecting frame section includes multiple parallel beams each connecting the opposing lateral frame sections.

In some embodiments, the processing head is disposed above the workpiece processing area and the connecting frame section is disposed below the workpiece processing area.

A workpiece scrap bin may be provided, disposed below the connecting frame section, with upper surfaces of the connecting frame section underlying the workpiece processing area and canted with respect to vertical, such that segments severed from the workpiece and falling on the upper surfaces of the connecting frame section are directed into the scrap bin.

In some embodiments, the processing head is in the form of a laser head configured to emit a beam of sufficient power to cut through a sheet-metal workpiece.

In some embodiments, the processing head is mounted on a motion unit supported from a top beam extending between the opposing lateral frame sections, with the motion unit controllably movable in a lateral direction to traverse the workpiece processing area. The connecting frame section may be vertically aligned with a front longitudinal edge of the top beam. In some cases, the motion unit and the beam interceptor are controllably moved by a common drive system, and may be physically coupled for common motion.

In some embodiments, the beam interceptor features a suction duct, which may include an elongated member configured to absorb energy from the processing beam. In some arrangements, the elongated member is a shaft pivotable to open a discharge chute connected to the shaft. The shaft may be hollow and connected to a flow of liquid coolant, to dissipate energy absorbed from the beam.

Another aspect of the invention features a method of transporting a workpiece processing machine that includes a motion unit, a cutting head mounted on the motion unit and configured to deliver a processing beam, and a frame configured to support the motion unit and defining a beam movement area of the motion unit. The method includes grasping a structural member of the machine located generally centrally in the beam movement area and beneath a workpiece support elevation, and lifting the workpiece processing machine by the structural member.

Several of the concepts disclosed here can be useful in the design of a workpiece processing system, such as a laser cutting machine tool, that provides a necessary stiffness at lower weight, due in part to the incorporation of a connecting frame section spanning the workpiece processing area and stiffening the connection between the opposing lateral frame sections. Such a connecting frame section can be protected from damage by a moving beam interceptor or containment unit, such as a suction duct.

The details of one or more embodiments of the invention are set forth in the accompanying drawings and the description below. Other features and advantages of the invention will be apparent from the description and drawings, and from the claims.

DESCRIPTION OF DRAWINGS

In FIG. 6, the chute member 18 is shown in three different positions: closed, rotated and rotated/displaced.

Like reference numbers indicate like elements.

DETAILED DESCRIPTION

The laser cutting system described in more detail below includes a beam interceptor or containment device, such as a suction duct, configured to move in coordination with motion of the cutting head, at least along one axis, which can be accomplished either by structurally connecting the containment device with the processing head system, or by using separate drives controlled to provide the necessary motion coordination. The suction duct or other beam containment/interception device is designed to safely intercept or contain the cutting beam, allowing structures to be disposed below the suction duct. As a result, the machine frame, which will be discussed in detail below, can include components positioned within the movement area of the cutting beam without such components being damaged by the cutting beam. In particular, the machine frame can include a structural member extending across the movement area of the cutting beam, preferably located in alignment with a gravity center of the machine, to provide a lifting point and support structure for moving the machine as a single unit.

Figure 1:
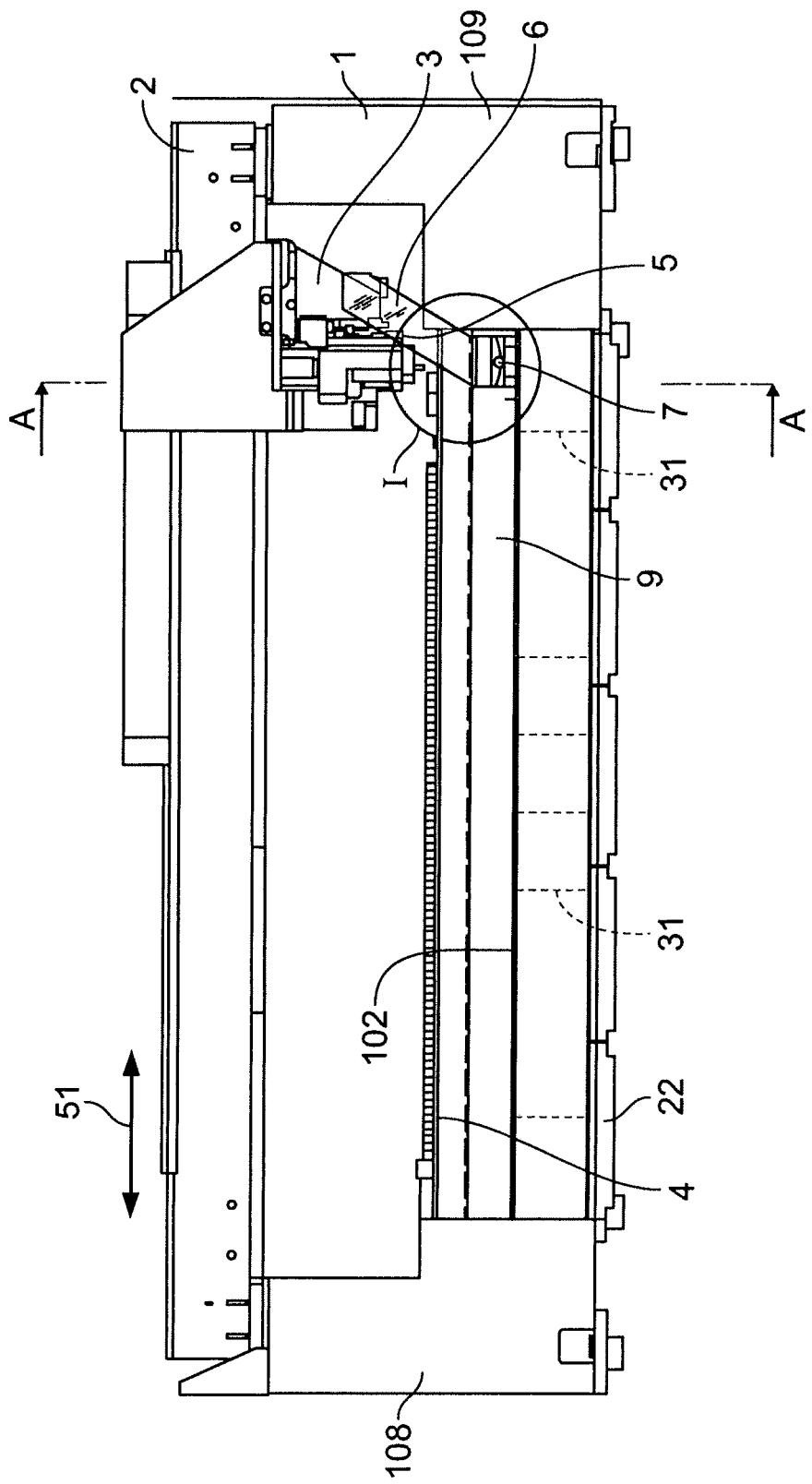
FIG. 1 is a front view of a laser cutting system.
Figure 4:
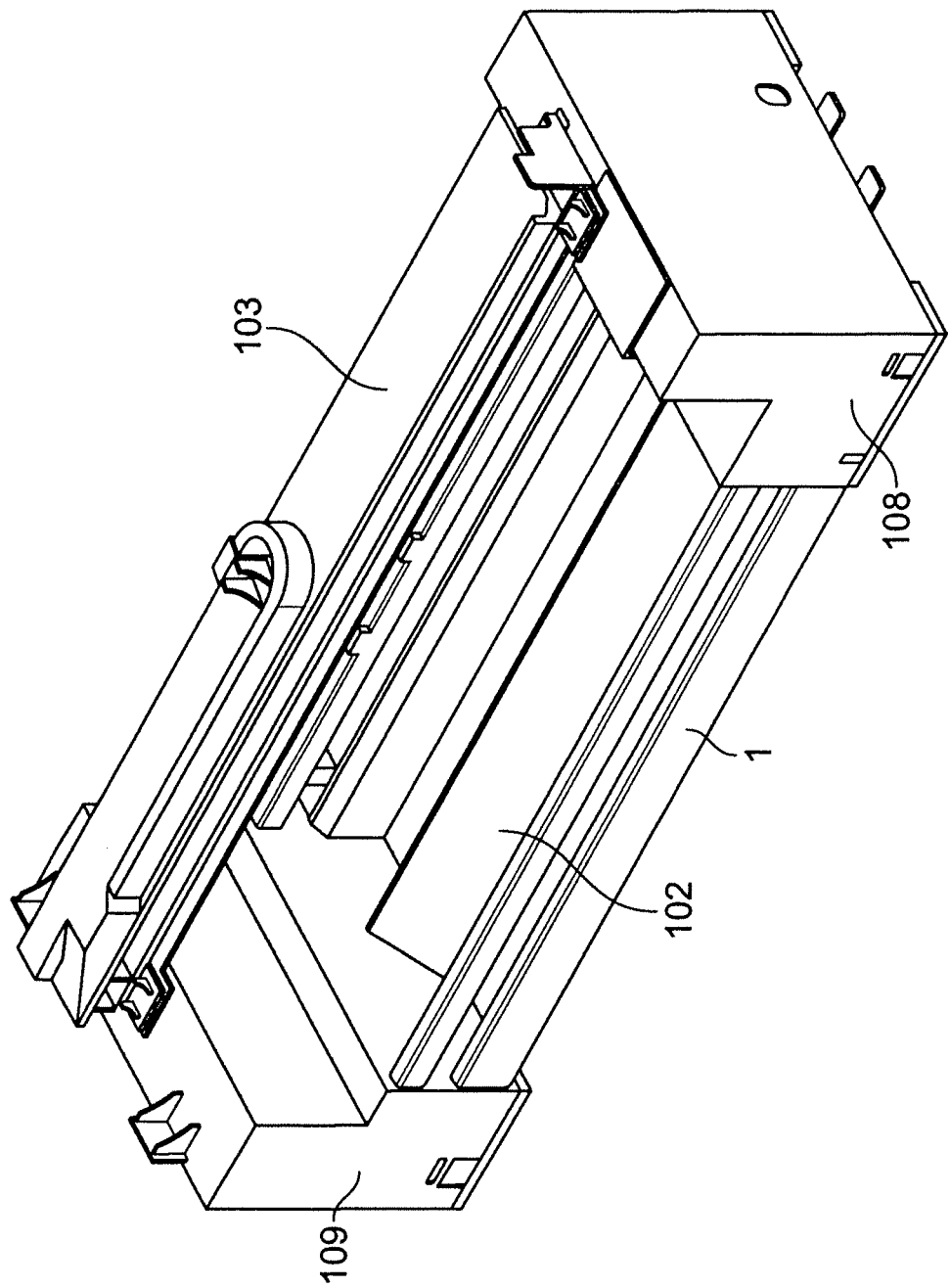
FIGS. 4 and 4A are perspective views of a machine frame for the laser cutting system with a motion unit and a transport unit omitted for clarity (FIG. 4) and included (FIG. 4A).
Figure 4A:
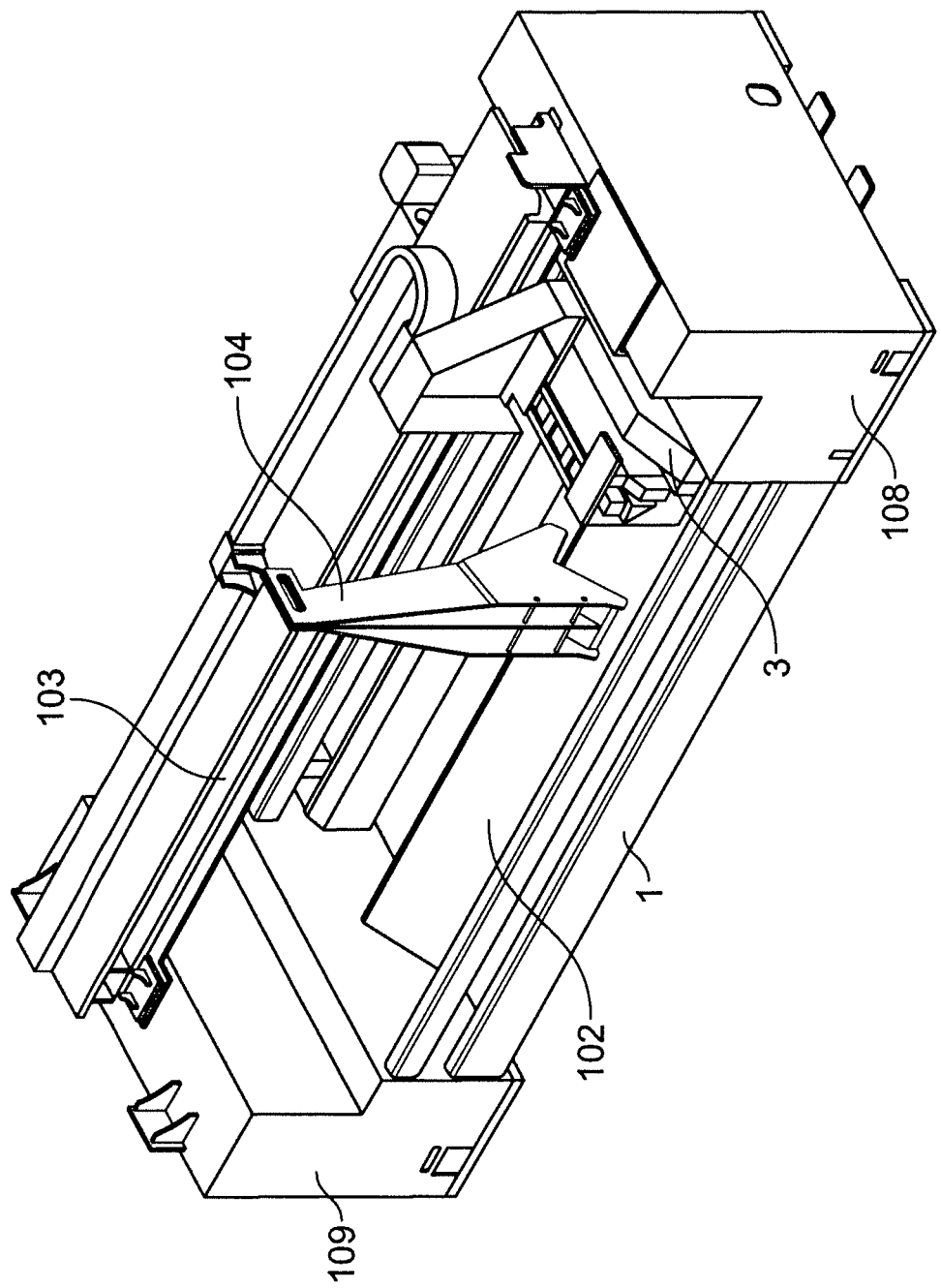
Figure 5:
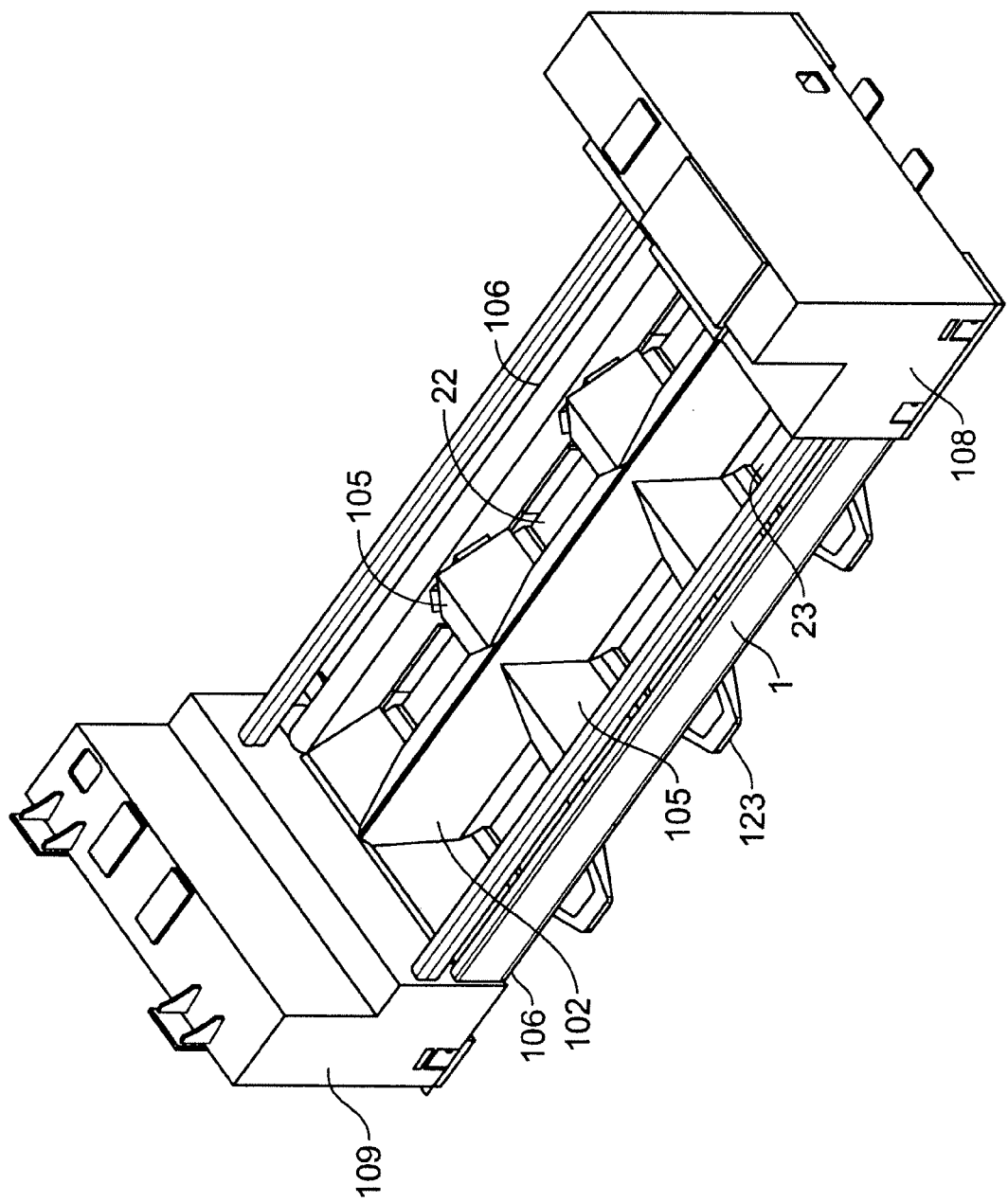
FIG. 5 is a perspective view of the machine frame shown in FIGS. 4 and 4A, with scrap drawers and drawer dividers installed.

Referring to FIGS. 1 and 4-5, a laser cutting system includes a machine frame 1 which includes slots 9 in its front and back walls. As shown in FIGS. 4-4A, the machine frame 1 includes, at opposite ends, first and second subframes or lateral frame sections 108, 109, a top beam 103, and a structural connecting frame section 102.

The laser cutting system includes a cutting head 5 that is mounted on a motion unit 3 in a conventional manner. An elongated suction duct 7 is mounted to the motion unit 3 in a manner to allow the suction duct 7 to move with the motion unit 3 along the X-axis 51 and thus with the cutting head 5. Accordingly, only a single motion unit drive (such as a drive motor, associated motor controller and appropriate power transmission components) is needed to move both the motion unit 3 and the suction duct 7. Mounting of the suction duct 7 may be accomplished, e.g., by support brackets 6, the structure of which will be described in detail below. The laser cutting system also includes support slats 4 (FIG. 3) which provide support for a workpiece to be cut by the cutting head 5. Alternatively, in another configuration, each of the motion unit 3 and the suction duct 7 are driven by a respective drive system, the drive systems being controlled to cause a cooperative motion. This latter configuration is particularly useful in machines where it is desired that the workpiece support structure be connected to the machine frame along its sides, and in which providing separate drives enables such support connections.

Figure 2:
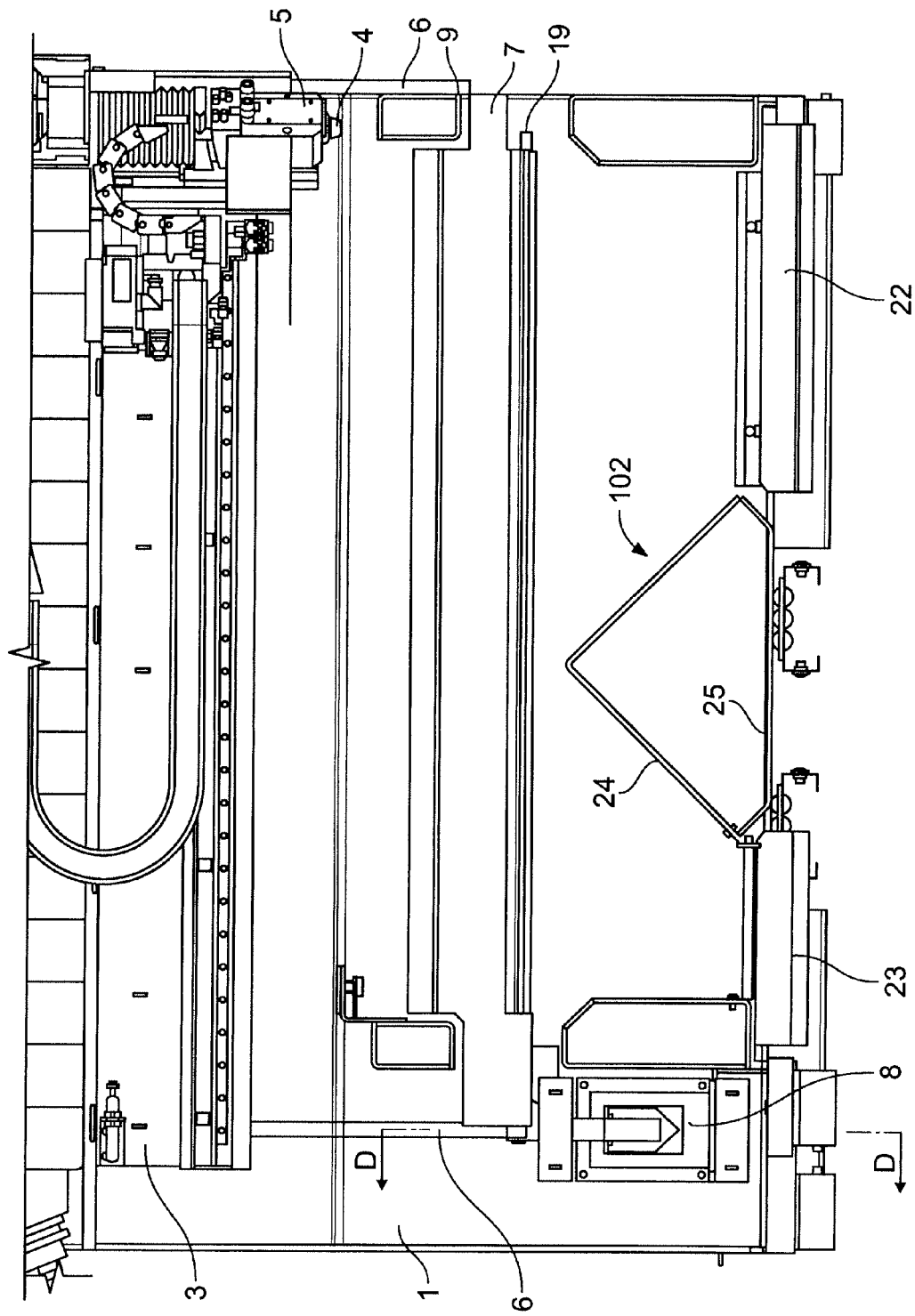
FIG. 2 is a cross-sectional view of the laser cutting system of FIG. 1, taken along line A-A.
Figure 3:
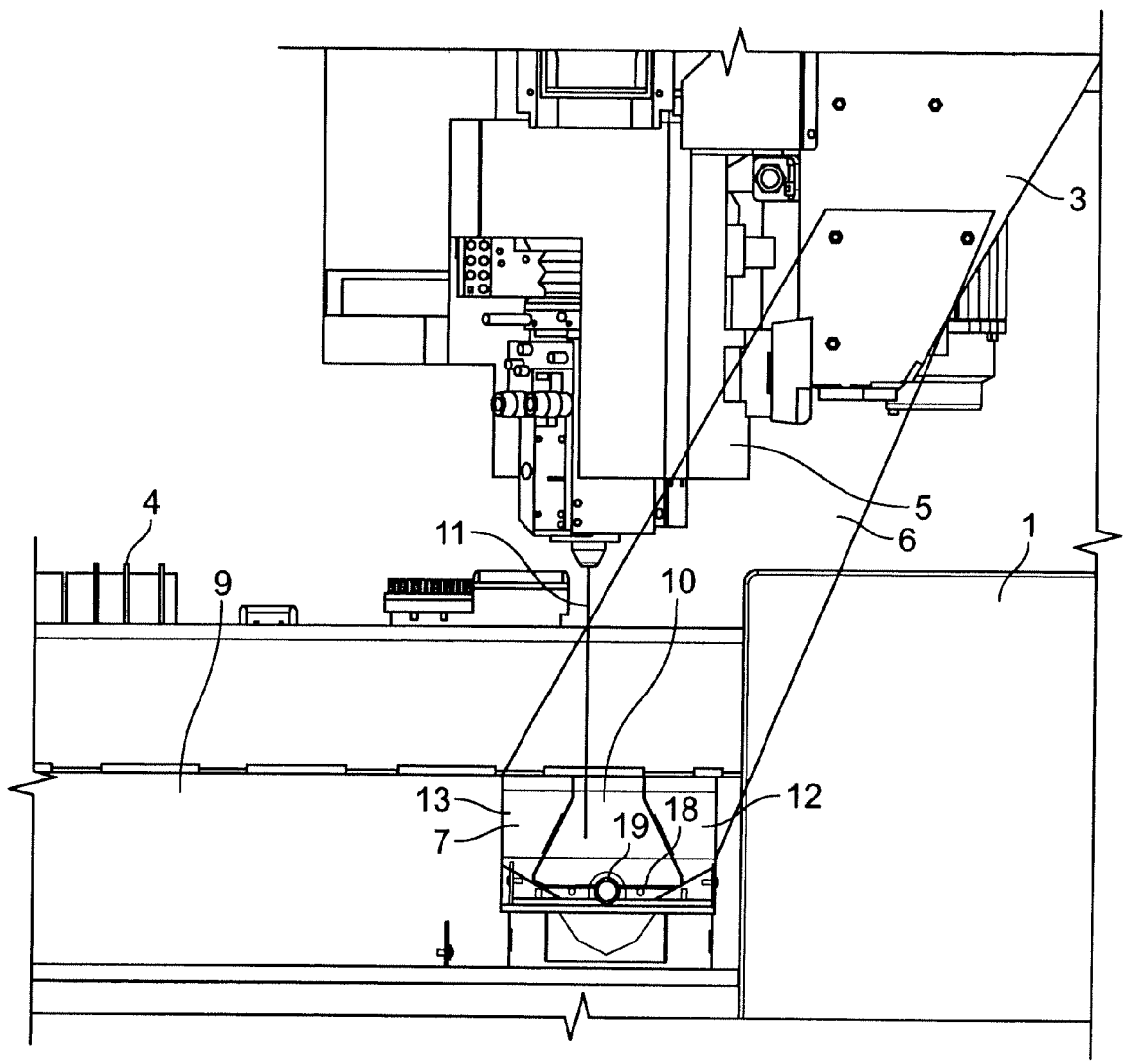
FIG. 3 is an enlarged detail view of area I of FIG. 1.

Referring now to FIGS. 2 and 3, the suction duct 7 moves along slots 9 and, because it is coupled to the motion unit, is positioned at all times with its suction opening 10 and shaft 19 directly below laser beam 11. (Note that the position of the beam 11 is shown slightly offset from its actual position directly aligned with shaft 19).

As discussed above, the machine frame 1 includes a frame connecting member 102, formed as a weldment of an upper portion 24 and a base portion 25 (FIG. 2). Both upper and lower portions are formed of bent 5/16 inch (8 mm) cold rolled steel sheet, and are welded together with 1/4 inch (6 mm) continuous welds. Six reinforcing steel plates 31 (FIG. 1) are welded within the 4 meter long connecting member 102, spaced more closely near its midpoint.

Frame connecting member 102 is positioned directly below the cutting area, which is possible due to the beam containment function of the suction duct 7, which contains the beam from the cutting head at all times. Preferably, the frame connecting member extends the length of the machine frame and is positioned aligned with an edge of top beam 2 supporting the motion unit and cutting head, on the subframes 108, 109 at the ends of the machine frame, as shown in FIG. 1. The frame connecting member is generally triangular in cross-section, and thus defines opposed angled surfaces, with the apex of the triangle being positioned closest to the workpiece being cut.

The frame connecting member performs several functions.

First, the frame connecting member 102 strengthens the frame, providing the structural integrity needed for the frame to absorb the inertia forces generated during cutting operations.

Second, the frame connecting member provides a single pick-up point, allowing the entire cutting machine (weighing approximately 8 tons or 8000 kg) to be lifted and transported from a single connection to the frame connecting member. This eliminates the need to pick up the cutting machine using other pick-up points that could result in damage to the machine. For example, if the machine is picked up by the top beam 103 this may compromise the accuracy of the machine since this beam guides movement of the motion unit and thus the cutting beam. To assist with lifting of the cutting machine, a machine lifting/transportation device 104 can be temporarily installed on the frame, as shown in FIG. 4A. The device 104 provides a secure and convenient connection point for a crane or other lifting mechanism, and is secured to member 102 by threaded fasteners engaging nuts welded to the inner surface of frame connecting member 102. Multiple mounting points for lifting device 104 are provided on frame connecting member 102, corresponding to centers of gravity of the machine in various states of assembly. With the apex of connecting member 102 aligned vertically with the front vertical edge of top beam 2, device 104 is offset forward just enough to clear the top beam.

Third, the angled surfaces defined by the triangular cross-section of the frame connecting member provide sliding surfaces which guide discharged parts and scrap falling from the workpiece into scrap drawers 22, 23 (FIGS. 1, 2, 5.) The frame connecting member also provides support for drawer dividers 105 (FIG. 5), which have slanted upper surfaces that guide particles and small parts that fall from the workpiece during cutting into the scrap drawings. Drawer dividers 105 extend from frame connecting member 102 to lower side frame housing members 106. In some configurations, drawer dividers 105 and lower side frame housing members are constructed and connected to provide further structural stiffness to the machine frame.

A suction duct for use with the machine frames disclosed herein will now be described. Further details may be found in a patent application filed concurrently herewith, entitled WORKPIECE PROCESSING USING A BEAM and assigned Ser. No. 61/167,289, filed Apr. 7, 2009, the entire contents of which are incorporated herein. Advantageously, the suction duct preferably has a relatively small suction volume, and thus does not require a large suction unit in order to obtain good removal of duct and debris. For example, in some cases the suction unit may have a suction capacity of less than about 700 m$^3$/h, or even less than 500 m$^3$/h. In some implementations, this allows a relatively low cost suction unit to be used, thereby reducing the overall cost of the cutting system without compromising its effectiveness. The suction duct is also designed to provide uniform suction across the entire cutting area of the cutting system.

Figure 6:
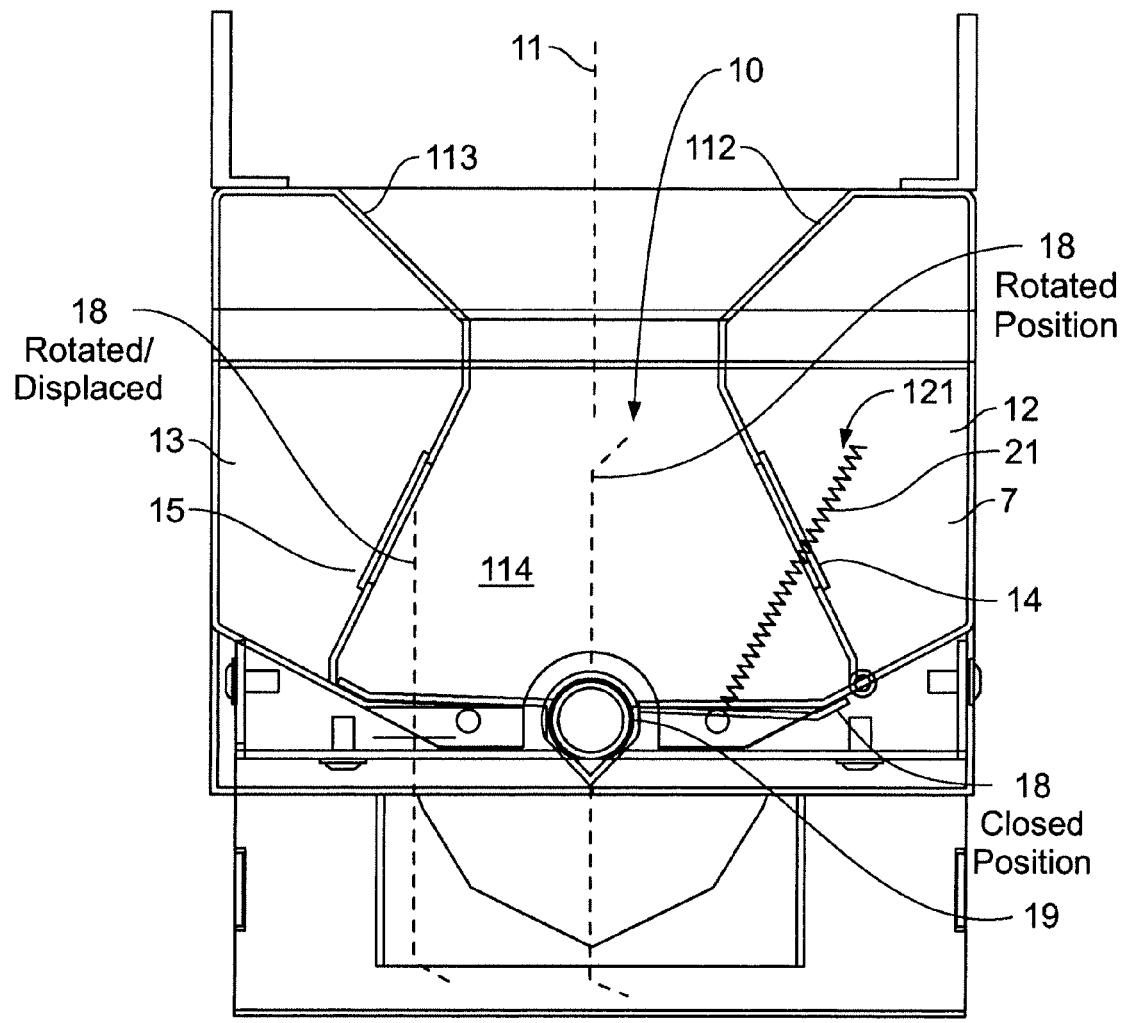
FIG. 6 is an enlarged view of a portion of FIG. 3.
Figure 7:
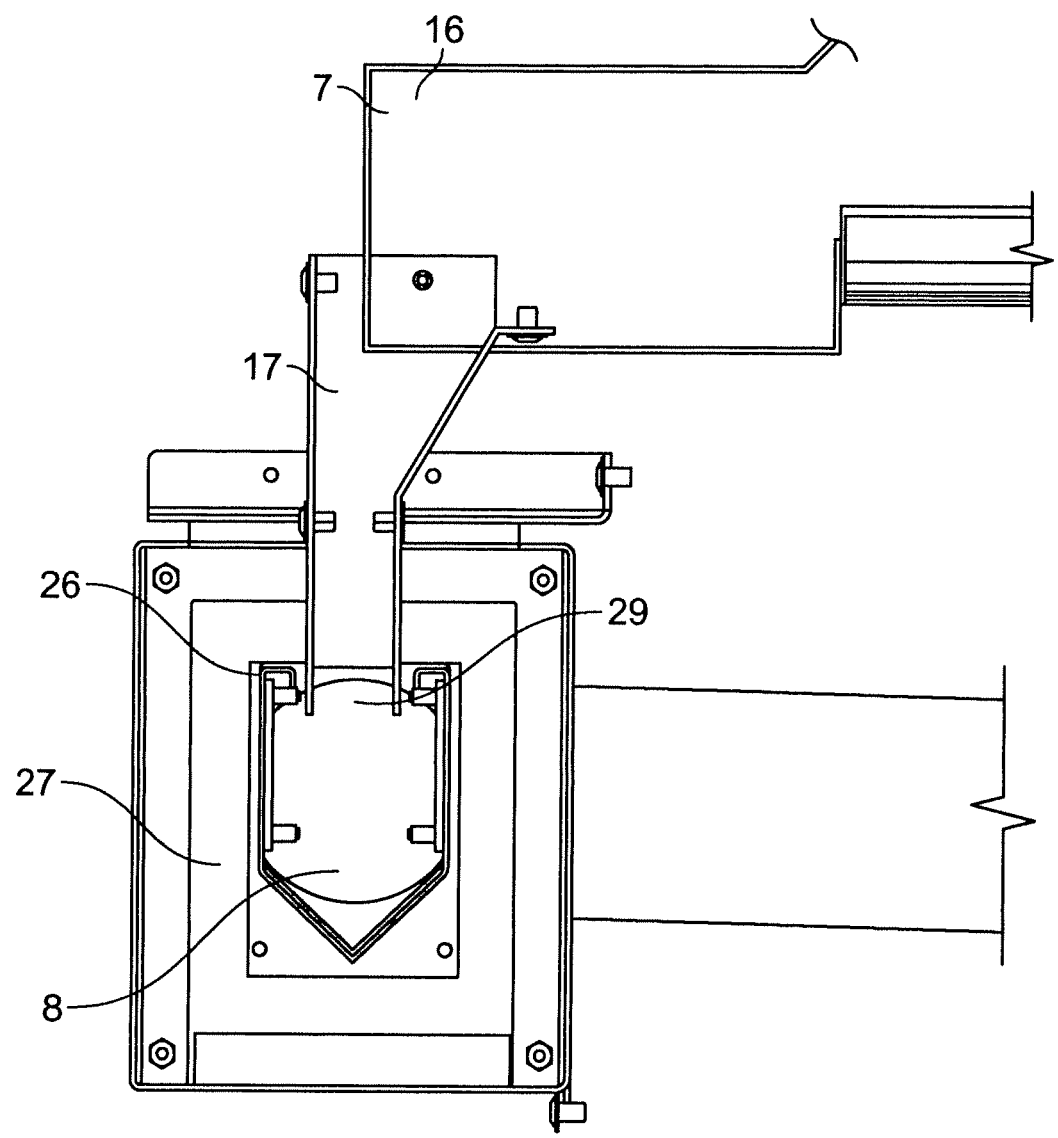
FIG. 7 is an enlarged view of the suction channel shown on the left hand side of FIG. 2 (area II of FIG. 8).
Figure 8:
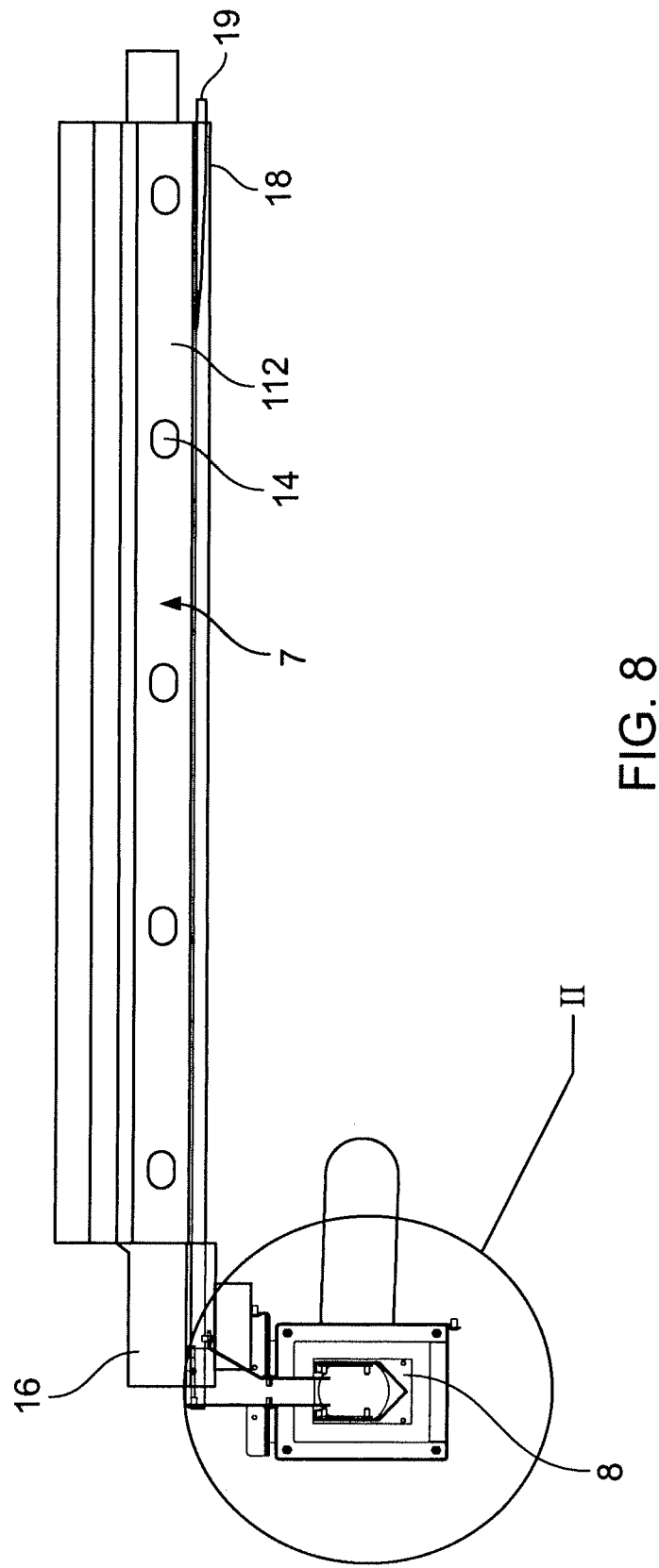
FIG. 8 is a cross-section of the catcher portion of the suction system taken along line A-A in FIG. 1.
Figure 9:
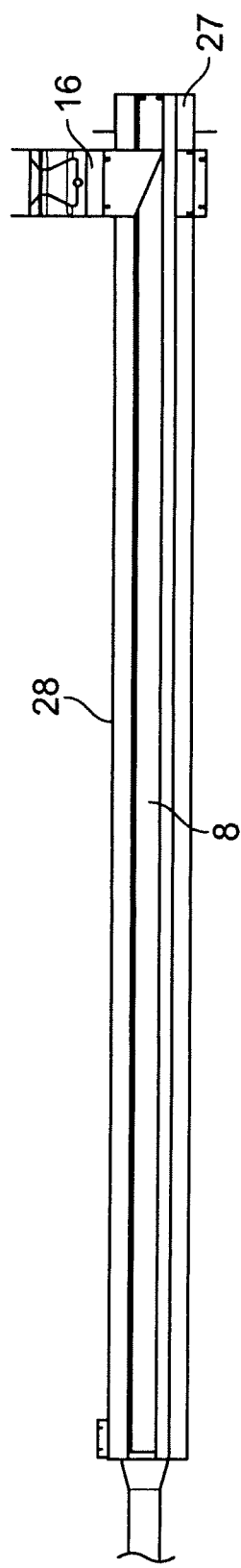
FIG. 9 is a cross-sectional view of the suction channel taken along the line D-D on FIG. 2.

The suction duct 7 includes two side suction chambers 12,13 (FIGS. 3, 6) which are defined by walls 112, 113 (FIG. 6). Wall 112 includes suction openings 14 (FIGS. 6, 8), which are offset from suction openings 15 in the opposite wall 113. These openings provide vacuum communication between the suction chambers 12,13 and a central volume 114 that is disposed below the cutting area during operation of the cutting system. The suction openings are offset in order to provide suction close to all cutting positions and to enhance the uniformity of the suction (uniform air speed) over the entire working area of the cutting head. The suction chambers 12,13 join at one end of the suction duct at an output chamber 16 (FIGS. 7-9). Output chamber 16 is connected by an output duct 17 to a suction channel 8 that is located on the back of the machine frame and which is itself connected to a suction unit (not shown).

During movement of the cutting head, the output duct 17 moves along the length of a member 26 of the suction channel 8 while the member 26 remains stationary. In order to maintain suction during this relative movement, left bellows 27 (FIGS. 7 and 9) and right bellows 28 (FIG. 9) are connected to the lower portion of the duct 17. The left and right bellows alternately expand and contract, in response to movement of the outlet duct 17, which pushes one bellows and pulls the other, to continuously seal the opening 29 of the suction channel member 26. The bellows are preferably formed of a fire retardant or fire resistant material.

During operation of the cutting head to cut a workpiece, fumes, debris and small parts fall into opening 10 of the suction duct 7. Fumes and fine dust move with the air flow through the offset suction openings 14, 15, and are drawn into the suction unit. Larger debris and small parts are discharged by a scrap chute 18 that is disposed at the base of the central volume 114. The scrap chute is movable between three positions, as shown in FIG. 6. In its normal, closed position, the scrap chute 18 seals against the bottoms of walls 112 and 113, preventing egress of scrap and parts. The scrap chute 18 is rotatable and then translatable, in two steps, into a rotated/displaced position in which scrap and parts can be discharged from the suction duct. This movement will now be described in detail.

Referring to FIG. 6, scrap chute 18 is mounted on a shaft 19. The shaft 19 serves as a pivot axis for the scrap chute 18, and also absorbs laser beam energy during cutting. The shaft 19 is water cooled in order to allow it to absorb laser beam energy without overheating and consequent damage.

When a cutting process is completed, the motion unit 3, and thus the suction duct 7, moves beyond the cutting area to a "park" position, e.g., to the right hand position shown in FIG. 1. In this position, the containment unit contacts a fixed stop (not shown) that rotates shaft 19 (clockwise in FIG. 6), extending extension spring 21. Extension spring 21 is connected at its end 121 to an outer surface of the suction duct and to its opposite end to the chute. Thus, spring 21 is extended when the chute 18 opens and acts as a return spring to return the chute 18 to its normal, closed position when the containment unit moves away from the park position.

The chute 18 first rotates 90 degrees to its rotated position, in response to the initial rotation of shaft 19. Further movement of motion unit 3 toward its end of travel causes shifting of the shaft 19 (to the left in FIG. 6). The shaft 19 and connected chute 18 thus move out of the way, providing a large gap for scrap discharge.

Discharged parts and scrap fall into scrap drawers 22,23 (FIGS. 1, 2 and 5), assisted by upper surfaces 24,25 of the frame connecting member, discussed above, which act as sliding surfaces. The cutting system is then ready for the next processing cycle. The parts and scrap can be removed from the scrap drawers 22, 23, by pulling the drawers out using handles 123 (FIG. 5).

When the next processing cycle begins, motion unit 3 moves away from its park position and the spring 21 closes the scrap chute 18. This prepares the suction duct 7 to receive scrap and parts, and positions shaft 19 to absorb laser beam energy, during the next cutting cycle. Shaft 19 is a seamless stainless steel tube with a ⅞ inch (22 mm) outer diameter and a ⅛ inch (3 mm) thickness, mounted to rotate in bores of sealed mounting blocks (not shown) at each end. The shaft diameter is selected to correspond to the laser beam width as it contacts the shaft (widened due to beam divergence, but graphically represented as a narrow line 11). Shaft 19 is cooled by flowing distilled water, such as a 2.8 liters per minute flow along the shaft, during laser cutting. The water may be, for example, the same coolant that cools the mirrors and other temperature-critical components of the machine, routed through the shaft on its way back to the water chiller.

Figure 10:
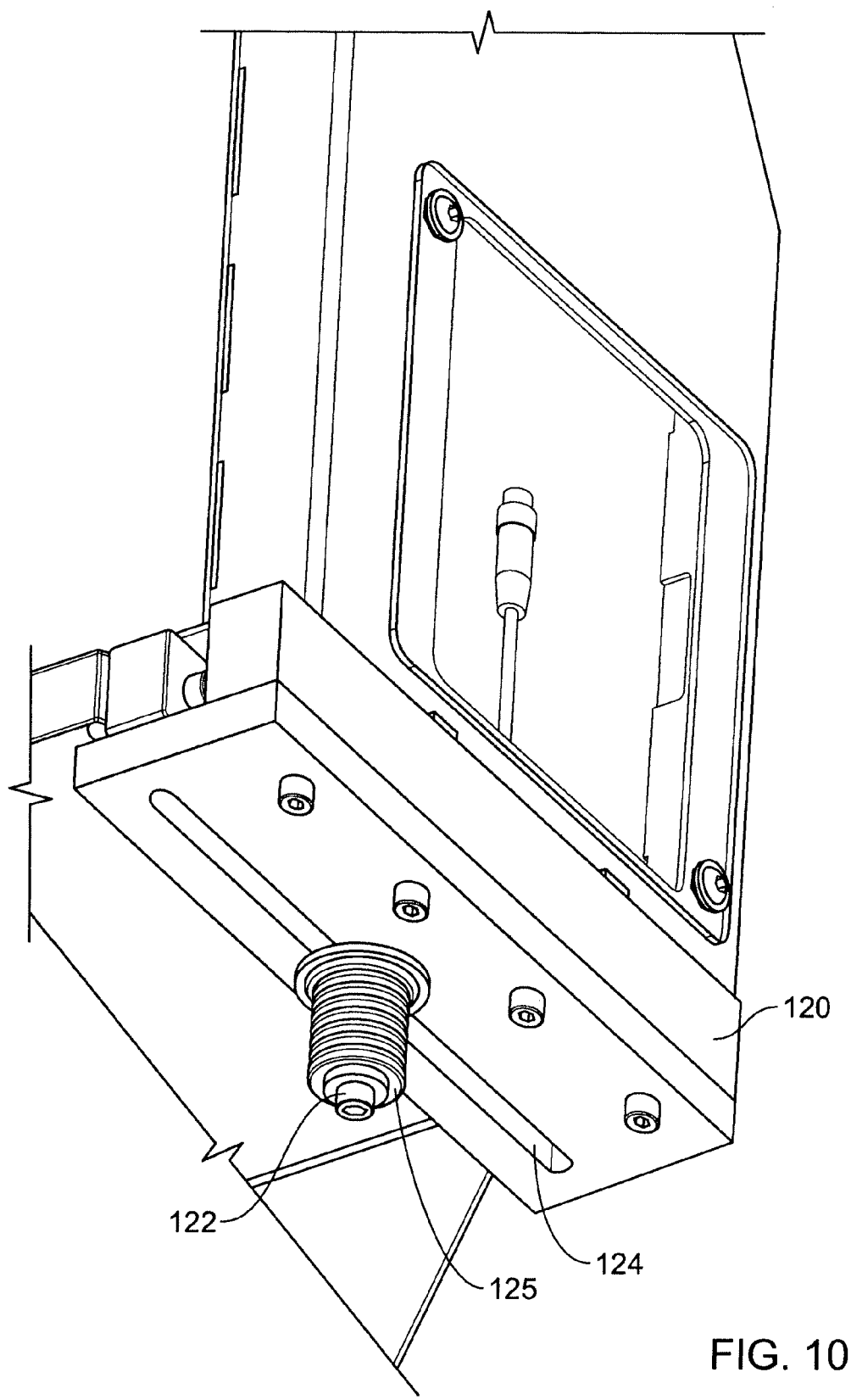
FIGS. 10 and 10A are partial perspective views showing details of the attachment of the catcher portion of the suction system to the motion unit of the cutting system.
Figure 10A:
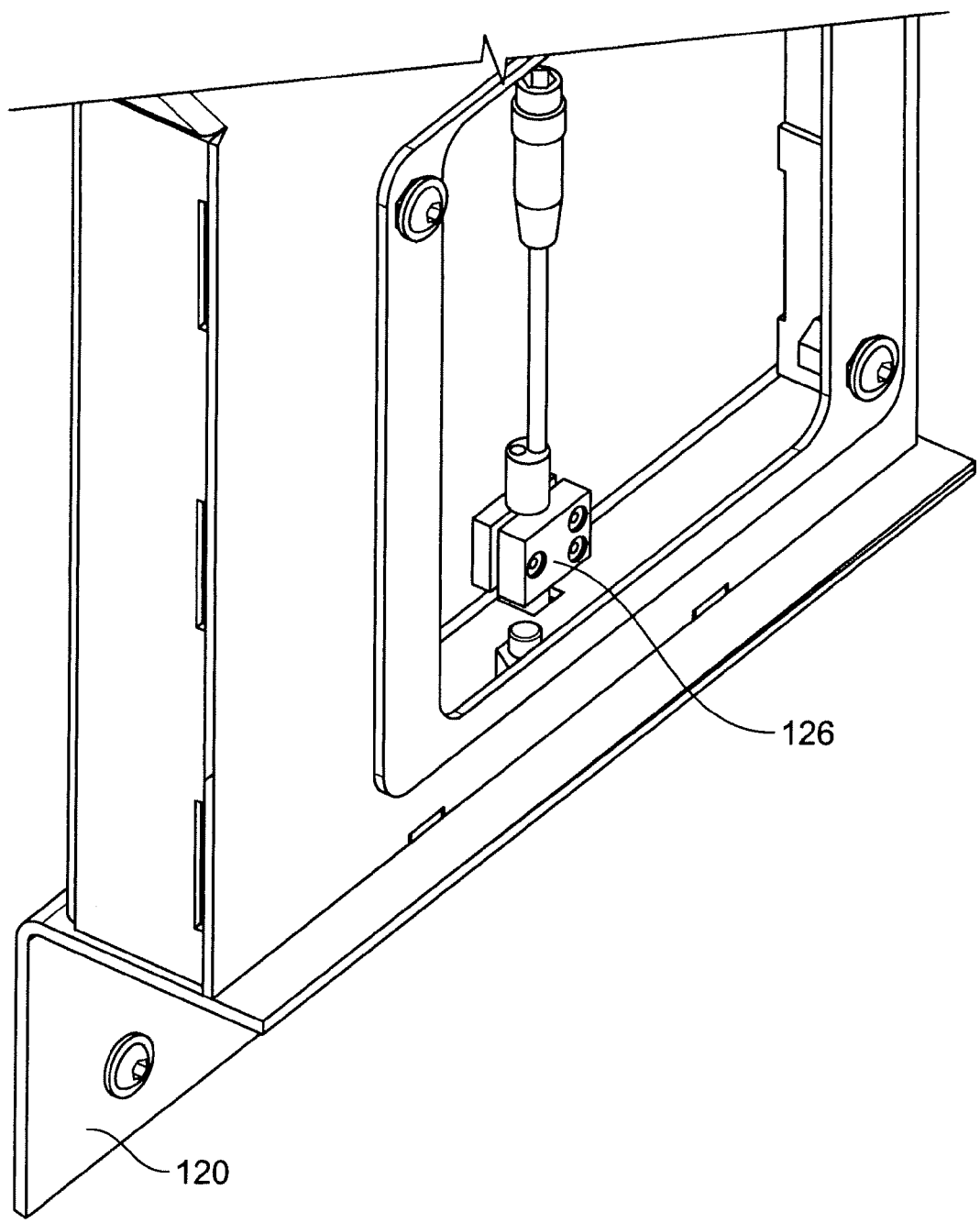

As a safety feature, to prevent damage to the cutting system if a long piece gets caught between the workpiece support (slats 4) and the suction duct 7, the mounting of the suction duct on the motion unit preferably includes a break-away feature. One example of such a feature is shown in FIGS. 10 and 10A. In this implementation, a bracket 120 that connects the motion unit 3 to the suction duct 7 is connected with a single fastener (e.g., screw or bolt) 122 on each side. This fastener is mounted in a slot 124, and is kept at a sufficient preload, maintained by a series of Belleville washers compressed under the head of the fastener, to keep it stationary during normal operation. However, the force of impact during an interlock situation causes the fastener 122 to slide in the slot and activate a switch 126 (FIG. 10A). This switch shuts down the cutting system, preventing catastrophic damage.

Figure 11:
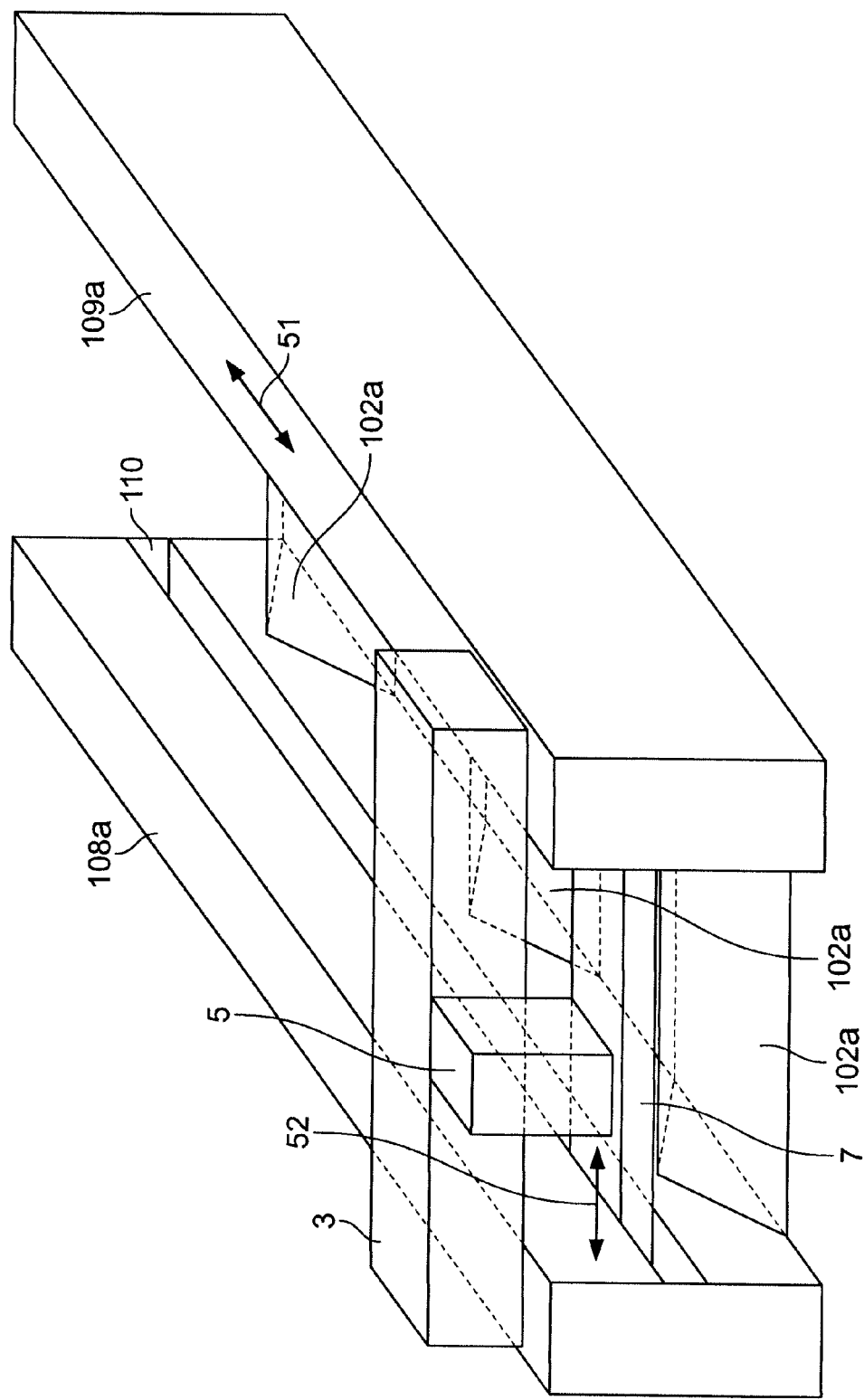
FIG. 11 schematically illustrates another machine frame arrangement.

Another machine frame configuration is shown in FIG. 11. In this arrangement, motion unit 3 carries the cutting head 5 and moves along the X-axis 51 spanning the workpiece processing area and supported at either end on lateral subframes 108a and 109a. Suction duct 7 is guided along subframes 108a and 109a along slots 110 and driven by a separate drive mounted within the lateral subframes, which also support the workpiece support slats (not shown, but extending between head 5 and suction duct 7) along their length. The cutting head 5 traverses the workpiece processing area from side to side along the motion unit 3 along the Y-axis 52, to process a workpiece. Lateral subframes 108a, 109a are structurally connected by three frame connecting members 102a, spaced apart to define scrap drawer openings between them. The frame connecting members 102a provide sufficient rigidity to the overall machine to maintain positioning during use and to enable lifting of the entire machine by either a single lifting point near the center of the middle frame connecting member, or from the two outer frame connecting members.

A number of embodiments of the invention have been described. Nevertheless, it will be understood that various modifications may be made without departing from the spirit and scope of the invention. For example, while laser cutting systems have been described above, other beam cutting heads may be used, e.g., flame jet cutting. As another example, different rotation/translation mechanisms for chute 18 can be used. Accordingly, other embodiments are within the scope of the following claims.

What is claimed is:

1. A workpiece processing machine comprising:
   a machine frame configured to support a sheet-form workpiece during processing of the workpiece across an elevated workpiece processing area;
   a processing head configured to controllably traverse the workpiece processing area while emitting a processing beam into the workpiece processing area to engage and process a supported workpiece in the workpiece processing area; and
   a beam interceptor positioned on a side of the workpiece processing area opposite the processing head and controlled to move across the workpiece processing area in coordination with the cutting bead along at least one axis, so as to remain positioned to intercept undeflected processing beam radiation leaving the workpiece processing area;
   wherein the machine frame includes
      opposing lateral frame sections extending along opposite sides of the workpiece processing area and supporting the processing head; and
      a structural connecting frame section connecting the opposing lateral frame sections and extending across the workpiece processing area on the side of the workpiece processing area opposite the processing head, the beam interceptor arranged to traverse the workpiece processing area between the processing head and the connecting frame section, such that material of the connecting frame section is protected by the beam interceptor from undeflected cutting beam radiation during workpiece processing.

2. The workpiece processing machine of claim wherein the connecting frame section is of sufficient structural strength and rigidity to enable lifting of the cutting system as a single unit without damage to the machine.

3. The workpiece processing machine of claim 1, wherein the connecting frame section comprises a principal beam structurally connecting the opposing, lateral frame sections and aligned with a center of gravity of the machine.

4. The workpiece processing machine of claim 1, wherein the connecting frame section comprises multiple parallel beams each connecting the opposing lateral frame sections.

5. The workpiece processing machine of claim 1, wherein the processing head is disposed above the workpiece processing area and the connecting frame section is disposed below the workpiece processing area.

6. The workpiece processing machine a claim 1, further comprising a workpiece scrap bin disposed below the connecting frame section, and wherein upper surfaces of the connecting frame section underlying the workpiece processing area are canted with respect to vertical, such that segments severed from the workpiece and falling on the upper surfaces of the connecting frame section are directed into the scrap bin.

7. The workpiece processing machine of claim 1, wherein the processing head comprises a laser head configured to emit a beam of sufficient power to cut through a sheet-metal workpiece.

8. The workpiece processing machine of claim 1, wherein the processing head is mounted on a motion unit supported from a top beam extending between the opposing lateral frame sections, the motion unit controllably movable in a lateral direction to traverse the workpiece processing area.

9. The workpiece processing machine of claim 1, wherein the beam interceptor-comprises a suction duct.

10. The workpiece processing machine of claim 3, wherein the connecting frame section further comprises at least one lateral frame stiffening beam spaced from the opposing lateral frame sections and connecting the principal beam to a side frame member of the machine frame.

11. The workpiece processing machine of claim 3, wherein the connecting frame section consists essentially of the principal beam laterally aligned with a center of gravity of the machine.

12. The workpiece processing machine of claim wherein the principal beam is of triangular transverse cross-section.

13. The workpiece processing machine of claim 3, further comprising a lifting lug detachably connected to the principal beam at is position along the principal beam spaced from the opposing lateral frame sections.

14. The workpiece processing machine of claim 12, wherein an upper apex of the triangular transverse cross-section is disposed at an elevation of the center of gravity of the machine.

15. The workpiece processing, machine of claim 13, wherein the lifting lug is detachably connected to the principal beam at a position corresponding to the center of gravity of the machine.

16. The workpiece processing machine of claim 8, wherein the connecting frame section is vertically aligned With a front longitudinal edge of the top beam.

17. The workpiece processing machine of claim 8, wherein the motion unit and the beam interceptor are controllably moved by a common drive system.

18. The workpiece processing machine of claim 9, wherein the suction duct comprises an elongated member configured to absorb energy from the processing beam.

19. The workpiece processing machine of claim 17 wherein the motion unit and the beam interceptor-are physically coupled for common motion.

20. The workpiece processing machine of claim 19, wherein the elongated member is a shaft pivotable to open a discharge chute connected to the shaft.

21. The workpiece processing machine of claim 20, wherein the shaft is hollow and is connected to a flow of liquid coolant.

22. A method of transporting a workpiece processing machine comprising a motion unit, a cutting head mounted on the motion unit and configured to deliver a processing beam, and a frame configured to support the motion unit and defining a beam movement area of the motion unit, the method comprising:
- grasping a structural member of the machine located generally centrally in the beam movement area and beneath a workpiece support elevation;
- lifting the workpiece processing, machine by the structural member; and
- moving the lifted machine by moving the structural member.

\* \* \* \* \*

UNITED STATES PATENT AND TRADEMARK OFFICE
CERTIFICATE OF CORRECTION

PATENT NO. : 8,466,388 B2
APPLICATION NO. : 12/755219
DATED : June 18, 2013
INVENTOR(S) : Leonid Zeygerman It is certified that error appears in the above-identified patent and that said Letters Patent is hereby corrected as shown below:

In the Claims

Column 7, line 46 (Claim 1, line 46), delete "bead" and insert --head--.

Column 7, line 64 (Claim 2, line 64), delete "claim" and insert --claim 1--.

Column 8, line 3 (Claim 3, line 3), delete "opposing," and insert --opposing--.

Column 8, line 12 (Claim 6, line 12), delete "machine a" and insert --machine of--.

Column 8, line 29 (Claim 9, line 29), delete "inceptor-comprises" and insert --inceptor comprises--.

Column 8, line 39 (Claim 12, line 39), delete "claim" and insert --claim 3--.

Column 8, line 43 (Claim 13, line 43), delete "at is" and insert --at a--.

Column 8, line 49 (Claim 15, line 49), delete "processing," and insert --processing--.

Column 8, line 54 (Claim 16, line 54), delete "With" and insert --with--.

Column 8, line 63 (Claim 19, line 63), delete "inceptor-are" and insert --inceptor are--.

Column 8, line 65 (Claim 20, line 65), delete "claim 19" and insert --claim 18--.

Column 9, line 13 (Claim 22, line 13), delete "processing," and insert --processing--.

Signed and Sealed this
Fifteenth Day of October, 2013

Teresa Stanek Rea
*Deputy Director of the United States Patent and Trademark Office*